United States Patent [19]

Huntley

[11] Patent Number: 4,498,892
[45] Date of Patent: Feb. 12, 1985

[54] POWER TRANSMISSION BELT

[75] Inventor: Peter Huntley, Des Plaines, Ill.

[73] Assignee: Borg-Warner Corporation, Chicago, Ill.

[21] Appl. No.: 475,006

[22] Filed: Mar. 14, 1983

[51] Int. Cl.³ .............................................. F16G 1/22
[52] U.S. Cl. .................................... 474/242; 474/201
[58] Field of Search ...................... 474/201, 245, 242

[56] References Cited

U.S. PATENT DOCUMENTS

| | | | |
|---|---|---|---|
| 3,949,621 | 4/1976 | Beusink et al. | 474/201 |
| 4,177,687 | 12/1979 | Russ, Sr. | 474/242 |
| 4,303,403 | 12/1981 | Lamers | 474/242 |
| 4,338,081 | 7/1982 | Hattori et al. | 474/201 |
| 4,365,965 | 12/1982 | Russ, Sr. | 474/201 |
| 4,386,921 | 6/1983 | Roberts | 474/242 |
| 4,424,049 | 1/1984 | Braybrook | 474/242 |

FOREIGN PATENT DOCUMENTS

| | | | |
|---|---|---|---|
| 0112057 | 8/1924 | Fed. Rep. of Germany | 474/242 |
| 2414989 | 9/1975 | Fed. Rep. of Germany | 474/201 |
| 0009345 | 1/1982 | Japan | 474/201 |
| 0065444 | 4/1982 | Japan | 474/201 |
| 0256918 | 9/1948 | Switzerland | 474/201 |
| 2088018 | 6/1982 | United Kingdom | 474/201 |

Primary Examiner—Stephen J. Novosad
Assistant Examiner—Bruce M. Kisliuk
Attorney, Agent, or Firm—Aubrey L. Burgess

[57] ABSTRACT

A composite load block for a power transmission belt constructed of at least one endless band and especially adaptable for use in a variable pulley transmission, comprising an assembly of first and second block members, the second block member embracing parts of the first block member and providing an elastically yielding component between the endless band and the first block member and having a lip portion received in a notch in the next adjacent composite load block, and the power transmission belt so constructed.

10 Claims, 15 Drawing Figures

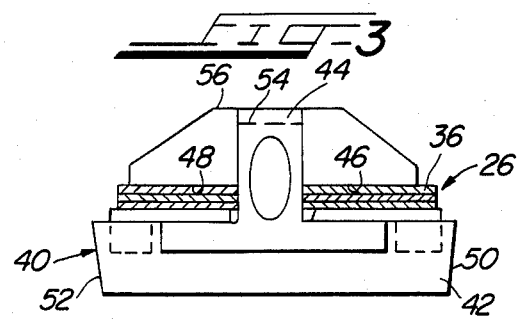
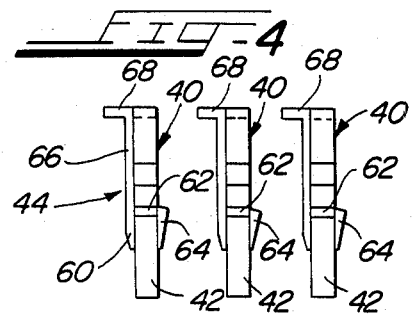
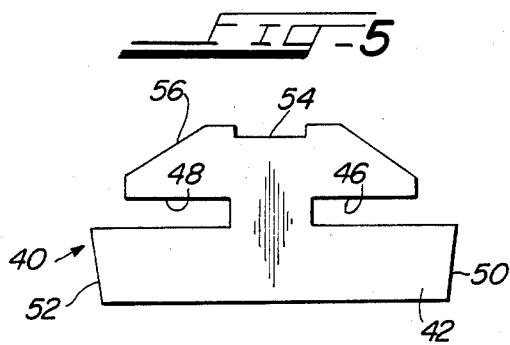
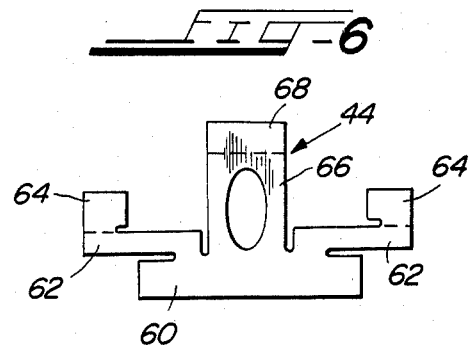
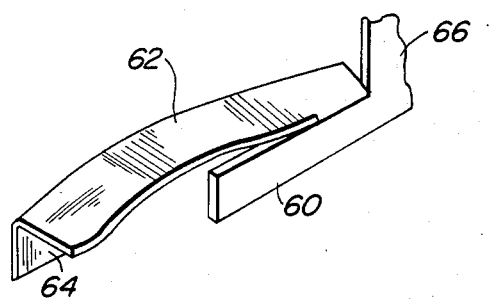
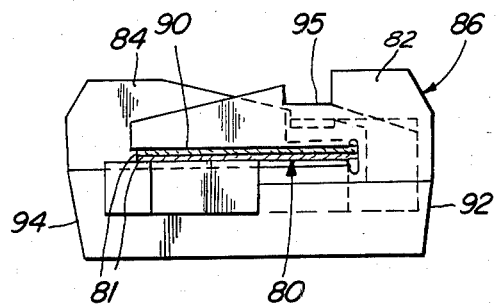
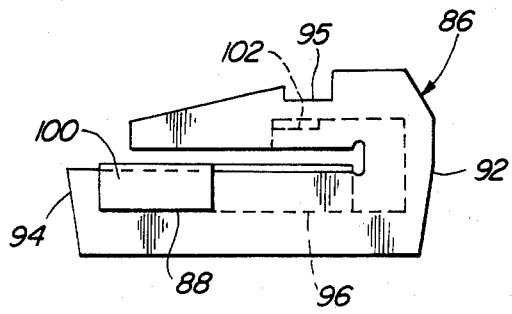
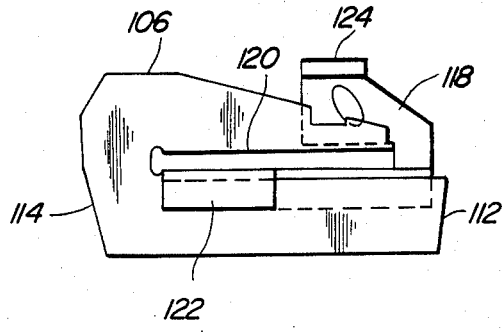

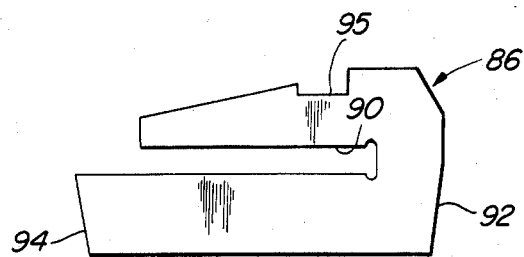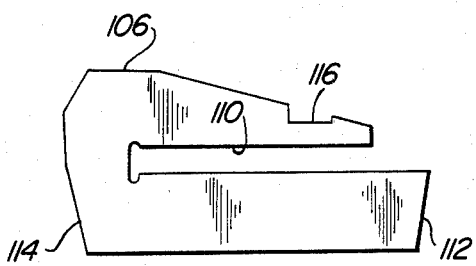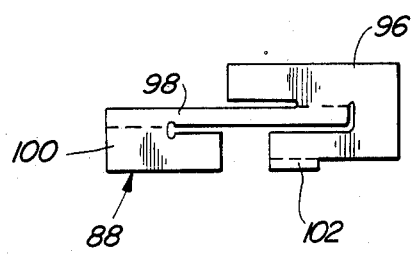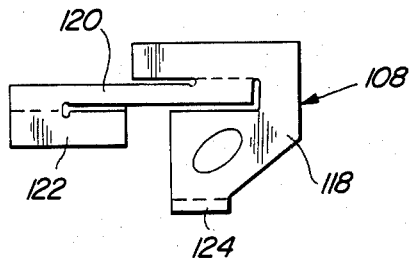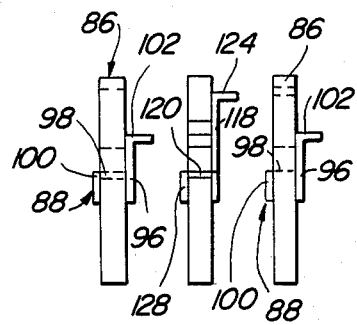

4,498,892

POWER TRANSMISSION BELT

BACKGROUND OF THE INVENTION

Variable pulley transmissions for transferring torque from an input shaft to an output shaft have been used for some time. In such arrangements a first pulley is mounted on the input shaft, and this pulley has at least one flange axially movable relative to its other flange to change the effective pulley diameter. A second, similarly adjustable pulley is mounted on the output shaft. A flexible belt intercouples the two pulleys to transfer torque between them. As the effective diameter of one pulley is changed, and simultaneously the effective diameter of the other pulley is changed in the opposite direction, the drive ratio between the input and output shafts is adjusted in smooth, continuous manner.

For over 30 years automotive engineers have recognized that the maximum operating efficiency of the engine could be achieved if the transmission could be controlled by adjusting to different loads and speed ratios such that the engine is maintained at its maximum efficiency point. This is not possible with a conventional geared transmission in which the drive ratio is adjusted in discrete steps, rather than continuously. Accordingly, efforts have been directed to the use of a continuously variable transmission of the type described above. This has resulted in the production and marketing in Europe of the Daf passenger car, using a flexible rubber belt in such a continuously variable transmission (CVT). Such a belt is subject to wear by reason of the torque it must handle and operates under severe temperature, vibration and other adverse conditions. Accordingly, efforts have been channeled to produce a flexible belt of metal, and some of these efforts are described in the patent literature.

By way of example, U.S. Pat. No. 3,720,113, shows generally V-shaped push blocks which are described as being made of non-compressible material, such a metal. They are also shaped to tilt with respect to each other when entrained around a disc or pulley. The blocks in U.S. Pat. No. 3,949,621 are described as trapezoidal in profile and of metal. A pair of slots, each intersecting an edge, is provided to receive the endless member. The blocks of non-deformable material described in U.S. Pat. No. 4,080,841 have a "window" or opening, and the surface of the block window of the block which comes in contact with the endless band is convexly curved in the transverse direction.

All of the push blocks described in the aforesaid patents require extensive machining to provide smooth surfaces in the opening or window of the blocks which contact the endless members, in an attempt to prevent damage to the endless members as the blocks move along the endless member. However this machining is expensive and raises the cost of a CVT to a level where it may not be commercially competitive. It is thus a prime consideration of the present invention to produce a block for use with a CVT or a fixed pulley transmission which is significantly less expensive than blocks produced according to earlier teachings.

SUMMARY OF THE INVENTION

The invention to be herein described relates to a power transmission belt comprising an endless band constructed of one or more superimposed metal bands with a plurality of push blocks, load blocks or push members slidable therealong. The theory of operation and the use of the belt is similar to that described in the aforesaid patents. The belt of this invention, as those of the prior art, is also usable in fixed ratio pulley drive systems.

The invention herein described has notable advantages over the aforesaid patents, especially in the manufacture of the load blocks. The composite load blocks of the present invention are generally manufactured of two stamped parts or members, one thicker than the other. The thinner, second member is provided with tab portions and a lip portion, which are bent to engage the body of the thicker block portion and to engage a notch in the next adjacent composite block, respectively. The second member or part also provides a smooth bearing surface for the bands which can, if desired, be convex. Because of the thickness of the tabs, the front and rear surfaces of the block need not be angled to permit wrapping of the assembly around a pulley, that is, the ability of the assembly to fit around and between the pulley flanges. The lip portion of one block registers in a notch of an adjacent block, and thus is advantageous in preventing transverse movement of one block relative to another block. Edgewise stress applied by the blocks to the band is reduced.

As an alternative construction, yet in keeping with the spirit of the invention, two different configurations of blocks can be used in a belt; this construction is especially useful when one endless band is used, while the previously described construction is especially advantageous where two or more endless bands are used.

BRIEF DESCRIPTION OF THE DRAWINGS

FIG. 3 is a sectional view through the belt of FIG. 2 taken on line 3—3 of FIG. 2 and showing the construction of a load block for the belt;

FIG. 4 is an expanded side view of adjacent blocks of the FIG. 3 construction without the endless bands;

FIG. 5 is a plan view of a first metal stamping forming a part of the load block of FIG. 3;

FIG. 6 is a plan view of a second metal stamping forming the other part of the load block of FIG. 3;

FIG. 7 is an enlarged, partial perspective view of a modification of the metal stamping of FIG. 6 as it is assembled with a load block part;

FIG. 8 is a sectional view through a second form of a belt constructed according to this invention;

FIGS. 9 and 10 are views of alternating load blocks usable in the belt of FIG. 8;

FIGS. 11 and 12 are plan views of first metal stampings forming parts of the load blocks of FIGS. 9 and 10, respectively;

FIGS. 13 and 14 are plan views of second metal stampings usable with parts of FIGS. 11 and 12 in the belt of FIG. 8; and FIG. 15 is an expanded side view of adjacent load blocks in the belt of FIG. 8.

DESCRIPTION OF THE PREFERRED EMBODIMENT

Figure 1:
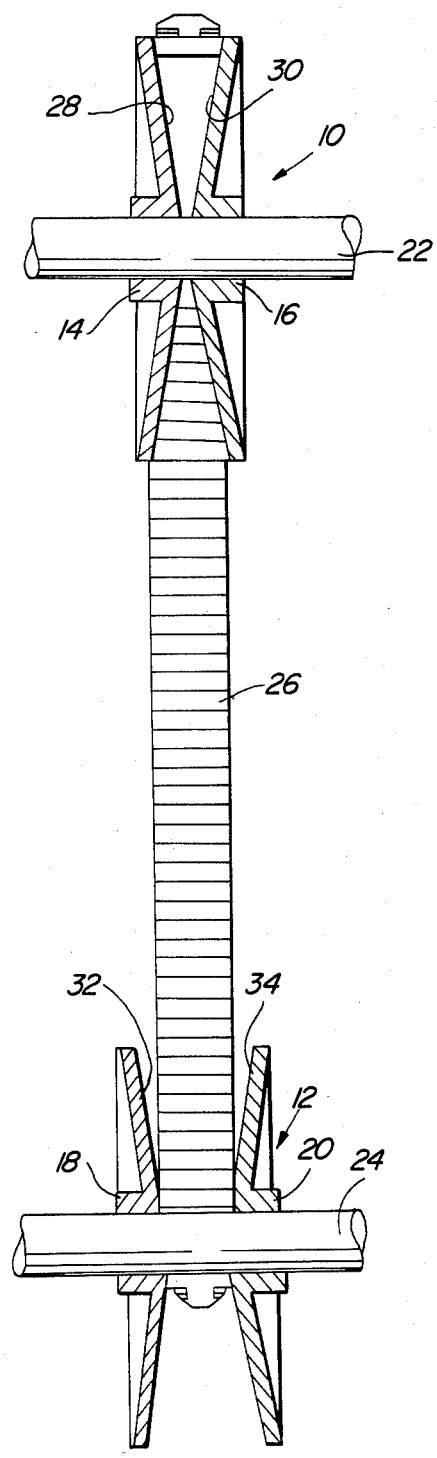
FIG. 1 is a schematic, frontal illustration of a pulley system in which the power transmission belt of this invention is usable.

Looking at FIG. 1, there is illustrated schematically a pulley transmission comprising a pair of pulleys 10 and 12, each pulley having a pair of flanges 14, 16 and 18, 20 and mounted on generally parallel shafts 22, 24. The pulleys are connected by a power transmission belt 26. The pulleys may be constructed so that at least one flange of each pulley is axially movable with respect to the other, to effect a smooth, continuous variation of the drive ratio between the shafts. The flanges have conical surfaces 28, 30 and 32, 34 drivingly engaged by the edges of the belt or belt parts, as will be explained hereinafter.

Figure 2:
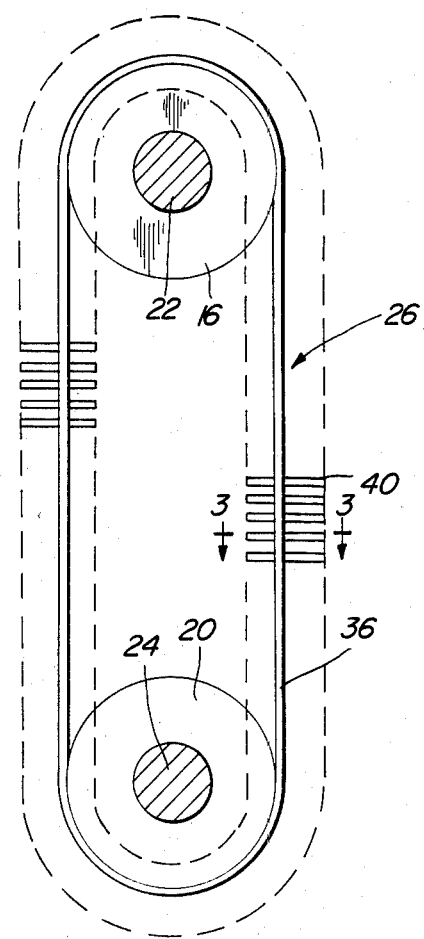
FIG. 2 is a general side illustration of one form of a belt constructed according to this invention.

One form of the belt 26 of this invention is illustrated in FIGS. 2 and 3, and comprises a plurality of nested endless members or metal bands 36 and load blocks 40 assembled thereon in an endless array with the load blocks generally touching one another. The number of nested endless members 36 in the belt 26 depends upon the load to be carried, the higher the load, the greater number of members 36. It is to be understood that a belt can be constructed of a single metal band, if so desired. The bands comprising the belt can be assembled in the manner taught in the before mentioned prior art.

Each block assembly 40 is like every other assembly and is preferably constructed of two metal stampings, 42 and 44. The stamping or block member 42 is the main part of a composite block assembly 40 and, as shown in FIG. 5, generally trapezoidal in plan view. Its thickness, as shown in FIG. 4, is in excess of the other stamping or block member 44 which is generally of relatively thin and bendable sheet metal. The member 42 has a pair of opposed notches or slots 46, 48 for receiving the belt 26, has angled side edges 50, 52 for driving engagement with the pulley flanges, and has a notch 54 in the upper surface 56.

The second metal stamping 44 is shown in FIG. 6 in plan view before being bent for use with the first metal stamping 42. Block member 44 comprises a body portion 60, a pair of wing portions 62, 62 attached to the body portion 60, each wing portion having a tab 64, a central section 66 and a lip portion 68. Unnecessary material is removed from the stamping, as shown in the Fig. in order to reduce weight. Body portion 60 and the tabs 64 are pressed or cold worked during forming, so that the thickness tapers as shown in FIG. 4. To assemble each composite load block, as shown in FIGS. 3 and 4, block member 44 is folded at the juncture of body portion 60 and wing portions 62, so that the wing portions are normal to the body portion, as shown in FIGS. 4 and 7. The folded member is then assembled with first block member 42, and tabs 64 are bent downwardly, in the direction towards the shafts 22 or 24, to engage the surfaces of the member 42, as shown in FIG. 4. The lip portion 68 is bent to extend axially outwardly of first member 42 and is adapted to be received in a notch 54 in the adjacent composite load block 40. Second block member 44 has its wing portions 62, 62 contoured before assembly with block member 42 such that they are bowed or curved, as illustrated in FIG. 7. This produces an elastically yielding surface between the lower face of the endless members 36 and the upper surfaces of the slots 46,48 in block member 42. Tension in members 36 causes a downward load, in the direction towards shafts 22 or 24, on the block member 42. This load is balanced by the forces between the angled side edges 50,52 and the respective conical surfaces 28,30 or 32,34. The elastically yielding member 62 enables the tension load in members 36 to be shared with reasonable uniformity by a number of the load block members 40 which are held between the conical surfaces. The sharing of the load prevents any one block from being loaded excessively.

The elastically yielding member 62 overcomes the costly requirement to tolerance with high precision the relative positions of the lower surfaces of the slots 46,48 and the angled side edges 50,52.

The length and taper of the body and tab portions of second member 44 when assembled, as particularly illustrated in FIG. 4, permits the blocks to wrap the pulleys and eliminates the usual tapering of the front and back surfaces of load blocks as is a conventional practice in the art.

The use of the lip portion 68 which fits into notch 54 in the next adjacent block substantially prevents block-to-block transverse or sideways movement, and more particularly prevents a shearing movement of the block out of the transverse plane containing the center lines of shafts 22 or 24. It thus reduces stress applied by the blocks to the bands because of such movements. The second member 44 has smooth surfaces 62 which contact the bands and thus can move therealong with substantial ease, and without damage to the bands and their surfaces.

A second form of belt is illustrated in FIG. 8 and comprises an endless member 80 generally constructed of a plurality of superimposed nested metal bands 81 and a plurality of load blocks 82 and 84 in an endless array along the entire length of the member 80 The load blocks 82 and 84 are of different configurations and alternate with one another.

The load blocks 82 and 84, like the load blocks 40 of the previous embodiment, are each constructed of two metal stampings or members, one thicker than the other; the difference between the blocks 82 and 84 is in their shape, not their function. The load block 82 is constructed of two metal stampings or members 86, 88 see FIGS. 11 and 13, the stamping 86 comprising the thicker of the two and having a generally horizontal open ended slot 90 to receive the endless member 80, and tapered sides 92 and 94 to engage the flanges of the pulleys in a pulley transmission. The stamping 86 also has a notch 95 in its upper surface. The stamping 86 is of sheet metal and comprises a generally U-shaped portion 96, a connecting, elongated portion 98 and a flap portion 100. The U-shaped portion 96 also has a tab 102. In use, the stamping 88 is folded, so that the portion 96 is normal to the portion 98. The folded stamping is assembled with the stamping 86, so that the portion 96 embraces a surface of the stamping 86. The tab 102 is folded to extend outwardly of the portion 96, as shown in FIG. 15, and to engage the notch 116, FIG. 12, of the adjacent block 84. The portion 98 covers the bottom of slot 90, and the portion 100 is folded downwardly to embrace the other surface of the stamping 86.

The load block 84 comprises a pair of metal stampings or members 106, 108, see FIGS. 12 and 14, the stamping 106 being thicker than the other and having a slot 110 to receive the endless member 80, tapered side edges 112 and 114 to engage the flanges of the pulleys of a transmission, and a notch 116 in the upper part of the stamping. The second stamping 108 is generally like the previously described stamping 88, and has a generally U-shaped portion 118, a connected, elongated portion 120 and a flap portion 122. The U-shaped portion also has a tab 124. The stamping 108 is used in essentially the same manner as the stamping 88, as before described. The tab 124 is adapted to be received in a notch 95 in the next adjacent block. The main difference in the two types of blocks is the assembly with the endless member 80, that is one of the block types is open at one side to receive the member 80, while the other block type is open at the other or opposite side to receive the member 80.

I claim:

1. A composite load block for a power transmission belt especially adapted for interconnecting the pulleys of a pulley drive system, each pulley having a pair of flanges, said belt having at least one endless metal band with a plurality of said load blocks assembled thereon in adjacent relationship and with at least portions of front and rear block surfaces contacting one another, each load block also having side edges for drivingly contacting the pulley flanges, the improvement wherein the composite load blocks comprise:

a first block member having front, rear and top surfaces, at least one slot defined by at least one surface and adapted to receive the endless band, and a notch at an uppermost top surface; and a second block member having tab portions embracing parts of said front and rear surfaces of said first block member at a location closely adjacent to said slot, including an elastically yieldable portion positioned between the endless band and the surface of said slot, and a lip portion extending outwardly from one of said tab portions;

said lip portion being received in a notch in a next adjacent one of said composite load block when said composite load blocks are assembled with said endless band.

2. A composite load block as recited in claim 1, wherein said first block member is metal and said second block member is sheet metal of a thickness less than that of said first block member.

3. A composite load block as recited in claim 1, wherein said first block member has a pair of slots, each adapted to receive an endless band, said endless bands being spaced laterally from one another.

4. A composite load block for a power transmission belt especially adapted for interconnecting the pulleys of a pulley drive system, each pulley having a pair of flanges, said belt having at least one endless band defined by a pair of edges with a plurality of said load blocks assembled thereon in adjacent relationship and with at least portions of front and rear surfaces contacting one another, each load block also having side edges for drivingly contacting the pulley flanges, the improvement wherein at least some of said composite load blocks comprise:

a first block member having front, rear and top surfaces, at least one slot defined by at least one surface and adapted to receive the endless band, and a notch at an uppermost top surface; and a second block member having tab portions embracing parts of said front and rear surfaces of said first block member at a location closely adjacent to said slot, including an elastically yieldable portion positioned between the surface of the said endless band the surface of said slot, and a lip portion extending outwardly from one of said tab portions;

said lip portion being received in a notch in a next adjacent one of the composite load blocks when the composite load blocks are assembled with said endless band, said blocks being assembled with said endless band, so that the open ends of said slots alternate at one edge of said band and the other edge of said band.

5. A composite load block as recited in claim 4, wherein said first block member is metal and said second block member is relatively thin sheet metal of a thickness less than that of said block member.

6. A power transmission belt especially adapted for interconnecting the pulleys of a pulley drive system, each pulley having a pair of flanges, said belt comprising the combination of:

at least one endless band;

a plurality of load blocks assembled on said band in adjacent relationship with at least portions of front and rear surfaces contacting one another, each load block having side edges for drivingly contacting the flanges of the pulleys of said drive system, and comprising a first block member having front, rear and top surfaces, at least one slot defined by a surface adapted to receive the endless band, and a notch in the top surface, and a second block member having tab portions embracing parts of said front and rear surfaces of said first block member at a location closely adjacent to said slot, including a yieldable portion positioned between the surface of the said endless band and the surface of said slot, said second block member also having a lip portion extending outwardly from one of said tab portions, said lip portion being received in a notch in a next adjacent composite load block on said endless band.

7. A power transmission belt as recited in claim 6, wherein said block members are metal and said second block member is of sheet metal and is relatively thin in relation to the first block member.

8. A power transmission belt as recited in claim 6, further comprising a pair of laterally spaced endless bands and wherein said first block member has a pair of laterally spaced slots, each adapted to receive one of said endless bands.

9. A power transmission belt especially adapted for interconnecting the pulleys of a pulley drive system, said belt comprising the combination of:

at least one endless band defined by spaced sides;

a plurality of load blocks assembled on said band in adjacent relationship with at least portions of front and rear surfaces contacting one another;

each load block having side edges for drivingly contacting the flanges of the pulleys of said drive system, and comprising a first block member having front, rear and top surfaces, at least one slot defined by a surface adapted to receive the endless band, and a notch at the top surface, and a second block member having tab portions embracing parts of said front and rear surfaces of said first block member at a location closely adjacent to said slot, including an elastically yieldable portion position between the surface of the said endless band and the surface of the said slot, said second block member also having a lip portion extending outwardly from one of said tab portions, said lip portion being received in a notch in a next adjacent composite load block on said endless band, said blocks being assembled with the open ends of said slots alternating from side-to-side along the length of said band.

10. A composite load block as recited in claim 9, wherein said block members are metal and said second block member is relatively thin sheet metal of a thickness less than that of said first block member.

* * * * *